(12) United States Patent
Carter

(10) Patent No.: US 8,798,545 B2
(45) Date of Patent: Aug. 5, 2014

(54) INTERFERENCE MITIGATION IN A FEMTOCELL ACCESS POINT

(75) Inventor: Alan James Auchmuty Carter, Swindon (GB)

(73) Assignee: Ubiquisys Limited, Swindon (GB)

( * ) Notice: Subject to any disclaimer, the term of this patent is extended or adjusted under 35 U.S.C. 154(b) by 0 days.

(21) Appl. No.: 12/822,354

(22) Filed: Jun. 24, 2010

(65) Prior Publication Data

US 2011/0009065 A1    Jan. 13, 2011

(30) Foreign Application Priority Data

Jul. 7, 2009  (GB) .................................. 0911771.4

(51) Int. Cl.
| | |
|---|---|
| *H04B 1/00* | (2006.01) |
| *H04B 15/00* | (2006.01) |
| *H04W 24/08* | (2009.01) |
| *H04W 84/04* | (2009.01) |
| *H04W 52/22* | (2009.01) |
| *H04B 17/00* | (2006.01) |
| *H04W 72/08* | (2009.01) |
| *H04W 52/24* | (2009.01) |
| *H04W 24/02* | (2009.01) |

(52) U.S. Cl.
CPC ............ *H04W 24/08* (2013.01); *H04W 84/045* (2013.01); *H04W 52/225* (2013.01); *H04B 17/0057* (2013.01); *H04W 72/082* (2013.01); *H04W 52/242* (2013.01); *Y02B 60/50* (2013.01); *H04W 52/244* (2013.01); *H04W 24/02* (2013.01); *H04B 17/0045* (2013.01)
USPC .......................................... 455/63.1; 455/436

(58) Field of Classification Search
CPC ..... H04W 24/02; H04W 52/24; H04W 52/14; H04W 52/40; H04B 7/005; H04B 1/707
USPC .............. 455/63.1, 423, 436, 447, 522, 67.11
See application file for complete search history.

(56) References Cited

U.S. PATENT DOCUMENTS

| 5,546,443 A | 8/1996 | Raith |
|---|---|---|
| 5,548,806 A | 8/1996 | Yamaguchi et al. |

(Continued)

FOREIGN PATENT DOCUMENTS

| CN | 1264992 A | 8/2000 |
|---|---|---|
| CN | 1567743 A | 1/2005 |

(Continued)

OTHER PUBLICATIONS

International Search Report and Written Opinion dated Aug. 6, 2010 from Application No. PCT/GB2010/050695.

(Continued)

*Primary Examiner* — Ping Hsieh
(74) *Attorney, Agent, or Firm* — Weaver Austin Villeneuve & Sampson LLP

(57) ABSTRACT

A base station in a cellular network, such as a femtocell access point, has a first coverage area, and is located in a second coverage area associated with a second base station. The base station operates to detect a possibility of interference based on estimated first path losses, between the base station and points in the first coverage area, and a second path loss, between the base station and a user equipment that is attached to the second base station. The second path loss may be estimated in the base station, although there is no connection between the base station and the user equipment attached to the second base station, by estimating the average transmit power of the user equipment that is attached to the second base station; detecting in the base station signals transmitted by the user equipment that is attached to the second base station; and estimating the second path loss from a difference between the estimated average transmit power and the power of the detected signals transmitted by the user equipment that is attached to the second base station.

18 Claims, 3 Drawing Sheets

(56) References Cited

U.S. PATENT DOCUMENTS

| | | |
|---|---|---|
| 5,604,730 A | 2/1997 | Tiedemann, Jr. |
| 5,625,672 A | 4/1997 | Yamada |
| 5,666,655 A | 9/1997 | Ishikawa et al. |
| 6,078,821 A | 6/2000 | Kaschke et al. |
| 6,085,106 A | 7/2000 | Sendonaris et al. |
| 6,301,478 B1 | 10/2001 | Wallstedt et al. |
| 6,314,294 B1 | 11/2001 | Benveniste |
| 6,405,048 B1 | 6/2002 | Haartsen |
| 6,438,379 B1 | 8/2002 | Gitlin et al. |
| 6,493,331 B1 | 12/2002 | Walton et al. |
| 6,553,235 B2 | 4/2003 | Bark et al. |
| 6,799,044 B1 | 9/2004 | Wesby et al. |
| 6,957,087 B1 | 10/2005 | Hedberg |
| 6,990,348 B1 | 1/2006 | Benveniste |
| 8,032,142 B2 | 10/2011 | Carter et al. |
| 8,463,281 B2 | 6/2013 | Maida et al. |
| 2002/0077138 A1 | 6/2002 | Bark et al. |
| 2002/0082023 A1 | 6/2002 | Bark |
| 2002/0119796 A1 | 8/2002 | Vanghi |
| 2004/0192279 A1 | 9/2004 | Backes et al. |
| 2005/0003846 A1 | 1/2005 | Anderson |
| 2005/0037763 A1 | 2/2005 | Hamamoto et al. |
| 2005/0180351 A1 | 8/2005 | Peric |
| 2005/0265288 A1 | 12/2005 | Liu et al. |
| 2006/0019665 A1 | 1/2006 | Aghvami et al. |
| 2006/0223546 A1 | 10/2006 | Claussen |
| 2006/0281412 A1 | 12/2006 | Skafidas et al. |
| 2007/0042799 A1 | 2/2007 | Jubin et al. |
| 2007/0076650 A1 | 4/2007 | Manjeshwar et al. |
| 2007/0082619 A1 | 4/2007 | Zhang et al. |
| 2007/0097939 A1 | 5/2007 | Nylander et al. |
| 2007/0099633 A1 | 5/2007 | Bamberger et al. |
| 2007/0104085 A1 | 5/2007 | Sambhwani et al. |
| 2007/0225029 A1 | 9/2007 | Abusch-Magder |
| 2007/0293260 A1 | 12/2007 | Xiao et al. |
| 2008/0037439 A1 | 2/2008 | Cave et al. |
| 2008/0039129 A1 | 2/2008 | Li et al. |
| 2008/0146154 A1 | 6/2008 | Claussen et al. |
| 2008/0151840 A1 | 6/2008 | Baker et al. |
| 2008/0153497 A1 | 6/2008 | Kalhan |
| 2008/0188260 A1 | 8/2008 | Xiao et al. |
| 2008/0188265 A1 | 8/2008 | Carter et al. |
| 2009/0042596 A1* | 2/2009 | Yavuz et al. ............... 455/522 |
| 2009/0129291 A1 | 5/2009 | Gupta et al. |
| 2009/0233616 A1* | 9/2009 | Kwon et al. ............. 455/452.2 |
| 2010/0035647 A1* | 2/2010 | Gholmieh et al. .......... 455/522 |
| 2010/0124930 A1* | 5/2010 | Andrews et al. ............ 455/436 |
| 2011/0039570 A1 | 2/2011 | Maida et al. |
| 2011/0237244 A1* | 9/2011 | Hiltunen et al. ............ 455/423 |
| 2012/0046055 A1 | 2/2012 | Carter et al. |
| 2013/0165175 A1 | 6/2013 | Carter et al. |
| 2013/0165176 A1 | 6/2013 | Carter et al. |
| 2014/0011489 A1 | 1/2014 | Maida et al. |

FOREIGN PATENT DOCUMENTS

| | | |
|---|---|---|
| CN | 101141184 A | 3/2008 |
| CN | 101237395 A | 8/2008 |
| EP | 0717508 | 6/1996 |
| EP | 0817400 | 1/1998 |
| EP | 0865172 | 9/1998 |
| EP | 0936753 | 8/1999 |
| EP | 0973353 | 1/2000 |
| EP | 1069702 | 1/2001 |
| EP | 1189369 | 3/2002 |
| EP | 1343336 | 9/2003 |
| EP | 1414257 | 4/2004 |
| EP | 1657950 | 5/2006 |
| EP | 1694091 | 8/2006 |
| EP | 1780904 | 5/2007 |
| EP | 1796291 | 6/2007 |
| EP | 1895714 | 3/2008 |
| EP | 1912345 | 4/2008 |
| EP | 1912458 | 4/2008 |
| EP | 1887709 | 7/2008 |
| EP | 2095531 | 9/2009 |
| EP | 2239785 | 10/2010 |
| GB | 2260879 | 4/1993 |
| GB | 2318483 | 4/1998 |
| GB | 2359452 | 8/2001 |
| GB | 2370729 | 7/2002 |
| GB | 2378089 | 1/2003 |
| GB | 2390953 | 1/2004 |
| GB | 2412541 | 9/2005 |
| GB | 2428937 | 2/2007 |
| GB | 2443865 | 5/2008 |
| GB | 2448367 | 10/2008 |
| GB | 2450123 | 12/2008 |
| GB | 2481331 | 3/2012 |
| GB | 2481544 | 3/2012 |
| GB | 2481545 | 3/2012 |
| JP | 2002/218528 | 8/2002 |
| JP | 2003/219478 | 7/2003 |
| JP | 2004/266781 | 9/2004 |
| JP | 2006/135673 | 5/2006 |
| JP | 2006/222560 | 8/2006 |
| JP | 2006/527943 | 12/2006 |
| JP | 2006/2527943 | 12/2006 |
| WO | WO 95/09513 | 4/1995 |
| WO | WO 96/31075 | 10/1996 |
| WO | WO 97/11567 | 3/1997 |
| WO | WO 98/09465 | 3/1998 |
| WO | WO 98/59435 | 12/1998 |
| WO | WO 99/00914 | 1/1999 |
| WO | WO 99/34531 | 7/1999 |
| WO | WO01/08322 | 2/2001 |
| WO | WO 01/52580 | 7/2001 |
| WO | WO 01/78327 | 10/2001 |
| WO | WO 02/054604 | 7/2002 |
| WO | WO 03/096570 | 11/2003 |
| WO | WO 03/101134 | 12/2003 |
| WO | WO 2005/046259 | 5/2005 |
| WO | WO 2005/069519 | 7/2005 |
| WO | WO 2006/010958 | 2/2006 |
| WO | WO 2006/083152 | 8/2006 |
| WO | WO 2006/107555 | 10/2006 |
| WO | WO 2007/015066 | 2/2007 |
| WO | WO 2007/040453 | 4/2007 |
| WO | WO 2007/044281 | 4/2007 |
| WO | WO 2007/051189 | 5/2007 |
| WO | WO 2008/082587 | 7/2008 |
| WO | WO2008/093100 | 8/2008 |
| WO | WO 2009/023587 | 2/2009 |

OTHER PUBLICATIONS

UK Intellectual Property Office Search Report dated Aug. 20, 2009 issued in GB0911771.4.
Office Action dated Dec. 11, 2013 for U.S. Appl. No. 13/705,063.
Office Action dated Dec. 4, 2013 for U.S. Appl. No. 13/706,263.
CN Office Action dated Jan. 6, 2014 for CN Application No. 201080030604.0.
EP Office Action dated Jul. 28, 2011 for EP Application No. 08702006.1.
EP Office Action dated Jul. 23, 2013 for EP Application No. 08702006.1.
EP Office Action dated Jan. 21, 2014 for EP Application No. 08702006.1.
RU Office Action dated Dec. 26, 2013 for RU Application No. 2012108046/07.
JP Office Action dated Apr. 4, 2014 for JP Application No. 2012-519058.
U.S. Appl. No. 13/725,665.
Notice of Allowance dated May 31, 2011, U.S. Appl. No. 11/801,337.
Non-final Office Action dated Aug. 23, 2010, U.S. Appl. No. 11/801,337.
Non-final Office Action dated Feb. 7, 2013 for U.S. Appl. No. 13/214,084.
Non-final Office Action dated Sep. 5, 2012, U.S. Appl. No. 12/820,995.
Notice of Allowance dated Dec. 28, 2012, U.S. Appl. No. 12/820,995.
Notice of Allowance dated Mar. 21, 2013, U.S. Appl. No. 12/820,995.

(56) References Cited

OTHER PUBLICATIONS

Combined Search and Examination Report dated Oct. 26, 2011, GB Application No. GB1115805.2.
Combined Search and Examination Report dated Oct. 26, 2011, GB Application No. GB1115809.4.
Combined Search and Examination Report dated Oct. 26, 2011, GB Application No. GB1115813.6.
EP Examination Report dated Dec. 20, 2011, GB Application No. GB1115805.2.
EP Examination Report dated Dec. 20, 2011, GB Application No. GB1115809.4.
EP Examination Report dated Dec. 20, 2011, GB Application No. GB1115813.6.
EP Second Examination Report dated Nov. 26, 2012, Application No. 10720945.4.
International Search Report dated Jun. 19, 2008 from corresponding International Application No. PCT/GB2008/000339.
International Search Report dated Nov. 28, 2008 from corresponding International Application No. PCT/GB2008/000339.
JP Office Action dated Aug. 31, 2012, JP Application No. 2009-547759.
International Search Report and Written Opinion dated Aug. 31, 2010 issued in PCT/GB2010/050680.
UK Combined Search and Examination Report dated Apr. 4, 2012, Application No. GB1203240.5.
UK Examination Report dated Dec. 13, 2010, issued in GB0702094.4.
UK Search Report dated Dec. 4, 2007 for U.K. Patent Application No. GB0702094.4, 3 pages.
UK Search Report dated Jun. 11, 2007, for related GB Application No. GB0702094.4.
UK Search Report dated Nov. 11, 2009 issued in GB0914026.0.
UK Search Report dated Nov. 27, 2007 for U.K. Patent Application No. GB0702094.4, 3 pages.
UK Search Report dated Nov. 30, 2007 for U.K. Patent Application No. GB0702094.4, 3 pages.
CN Office Action dated May 3, 2012 for CN Application No. 200880010581.
CN Office Action dated Mar. 25, 2013 for CN Application No. 200880010581.
Final Office Action dated Oct. 15, 2013 for U.S. Appl. No. 13/214,084.
EP Search Report dated Nov. 28, 2013 for EP Application No. 13179530.4.
EP Search Report dated Nov. 27, 2013 for EP Application No. 13179529.6.
EP Search Report dated Nov. 27, 2013 for EP Application No. 13179527.0.
CN Office Action dated Feb. 25, 2014 for CN Application No. 201080035865.1.
JP Office Action dated Apr. 4, 2014 for JP Application No. 2012-524280.

* cited by examiner

INTERFERENCE MITIGATION IN A FEMTOCELL ACCESS POINT

This invention relates to a femtocell access point, and in particular to interference mitigation in the access point.

It has previously been disclosed in WO2008/093100 that a femtocell access point should set its transmit power based on measurements made by detecting signals transmitted by nearby base stations, including neighbouring macro layer base stations. These signals can be detected by the femtocell access point itself, or can be detected by mobiles connected to the femtocell access point, which then send measurement reports to the femtocell access point. More specifically, it is known to set this femtocell transmit power at the lowest value consistent with adequate coverage throughout its intended coverage area (within a specific residential or small business premises, for example), in order to minimise the leakage of signals outside this intended coverage area. However, despite this, as the deployment of the femtocell access point within the customer premises is under the control of the customer, this leakage cannot be avoided in all cases. For example, if a customer positions the femtocell access point close to a window or an external wall, there is the possibility of interference between the transmissions from the femtocell access point and the mobiles connected to the surrounding macro network.

According to a first aspect of the present invention, there is provided a method of operating a base station in a cellular network, the base station having a first coverage area, and being located in a second coverage area associated with a second base station, the method comprising:

estimating a distribution of respective first path losses between the base station and points in the first coverage area;

estimating in the base station a second path loss between said base station and a user equipment that is attached to the second base station; and determining on the basis of said estimated first and second path losses whether the base station is causing interference with transmissions from the second base station.

Thus, the base station is able to determine on the basis of the estimated path loss distributions whether interference is likely to be occurring.

According to a second aspect of the present invention, there is provided a base station, configured to operate in accordance with the method of the first aspect.

For a better understanding of the present invention, and to show how it may be put into effect, reference will now be made, by way of example, to the accompanying drawings, in which: —

Figure 1:
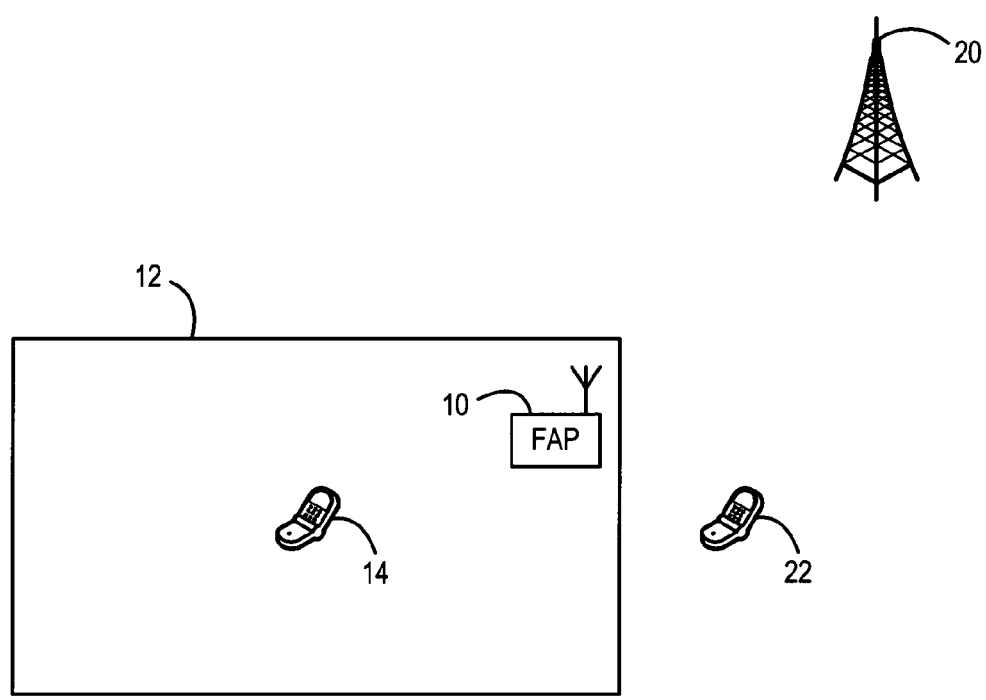
FIG. 1 is a schematic illustration of a part of a mobile communications system in accordance with the present invention.

FIG. 1 shows a part of a mobile communications network, in which a femtocell access point (FAP) 10 is located within a customer premises building 12, which may be a residential or office building, for example. Also shown in FIG. 1 is a customer user equipment (UE), in the form of a mobile phone, although it will be appreciated that the relevant UEs may take many forms. The illustrated UE 14 is registered on the femtocell access point 10, and is therefore able to connect into the mobile network operator's cellular network through the femtocell access point 10 by means of the broadband internet connection between the femtocell access point 10 and the core network of the mobile network. It will be appreciated that there may be more than one such UE registered on the femtocell access point 10, but the UE 14 is representative of all such UEs.

As illustrated in FIG. 1, the customer premises 12 are located in the coverage area of a macro layer base station, or Node B, 20 in the same cellular network as the femtocell access point 10. The invention is described here with reference to a UMTS cellular network, although it will be apparent that the same principle applies in other cellular networks. FIG. 1 also shows a user equipment 22, which is close to the customer premises 12 within the coverage area of the macro layer base station 20. It will be apparent that, in reality, the cellular network will include many such macro layer base stations, but it is not necessary to describe their operation for an understanding of the present invention. It will also be apparent that there will typically be many such UEs, but the UE 22 is representative of all such UEs.

As is known, the femtocell access point comprises radio frequency transmit and receive circuitry for transmitting and receiving signals over the frequencies in use in the cellular network. In particular, the femtocell access point is able, while communicating with an attached UE (such as the UE 14), to detect signals on other frequencies. In addition, the femtocell access point 10 includes a processor, for receiving measurement reports from attached UEs, for obtaining information from the signals received by the femtocell access point itself, and for controlling aspects of the operation of the femtocell access point, as described in more detail below.

Typically, a mobile network operator will have two or more carrier frequencies. The first frequency is often known as the 'camping carrier', and is typically used to cover the complete region with multiple cell sites. The second carrier is often known as the 'capacity carrier', and is only deployed in certain areas, being used for capacity offload and/or High Speed Download Packet Access (HSDPA). Operators often deploy femtocell access points on the capacity carrier, in order to minimize interference effects on the camping carrier. However, the following description makes no assumptions about which carrier is being used either by the femtocell access point 10 or by the macro layer base station 20.

In this illustrative example, the user equipment 22 has no connection with the customer premises 12, is not registered on the femtocell access point 10, and is therefore not able to connect into the mobile network operator's cellular network through the femtocell access point 10. This leads to the risk that, if the femtocell access point 10 is transmitting signals on the same carrier frequency as the macro layer base station 20, if the femtocell access point 10 is transmitting signals at a transmit power that is high enough to guarantee coverage throughout the premises 12, and if the user equipment 22 moves very close to the femtocell access point 10, there will be an interference problem.

Specifically, the user equipment 22 will potentially be in a 'deadzone' around the femtocell access point 10, in which the macro layer coverage has been degraded to such an extent that a measurement of the carrier power (Ec) to the total interference (Io) of the received Common Pilot Channel in the macro layer (that is, the CPICH Ec/Io value) falls below a certain level (typically −14 dB to −16 dB). This cannot be resolved by handing over the user equipment 22 as might be the case where two macro layer base stations are involved, because the user equipment 22 is unable to register on the femtocell access point 10. Therefore, the user equipment 22 may have to hand over to another UMTS carrier, or alternatively a GSM carrier.

Figure 2:
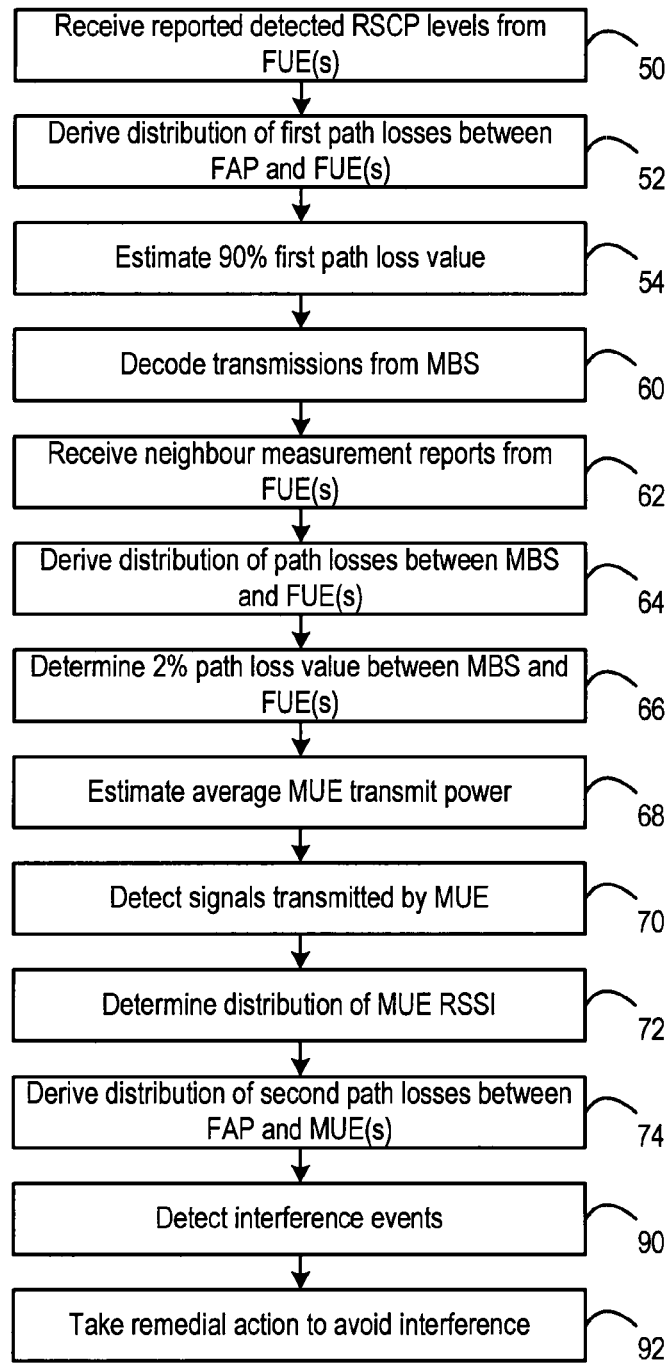
FIG. 2 is a flow chart, illustrating a method in accordance with the present invention.

FIG. 2 therefore shows a process, carried out in the femtocell access point 10, and illustrated by way of a flow chart, for mitigating the possibility of such interference.

In general terms, the process involves determining the probability of interference, by comparing the path losses between the femtocell access point 10 and connected user equipments in the coverage area, with the path losses between the femtocell access point 10 and nearby user equipments that are connected to the macro layer base station. Since there is no established radio link between the femtocell access point 10 and those user equipments that are connected to the macro layer base station, it is necessary to estimate this path loss from the available information.

In step 50, the femtocell access point 10 receives measurement reports from one or more user equipment that is connected to the femtocell access point (referred to as a femtocell user equipment, FUE). These measurement reports indicate both the femtocell detected received signal code power (RSCP) level as measured at the FUE, and the surrounding macro network nodeB detected received signal code power (RSCP) level as measured at the FUE.

The femtocell access point 10 knows its transmitted CPICH (pilot) level, and hence is able to calculate the difference between the transmitted CPICH (pilot) level and the reported detected CPICH RSCP level, which will be the path loss between the femtocell access point 10 and the femtocell user equipment 14.

Figure 3:
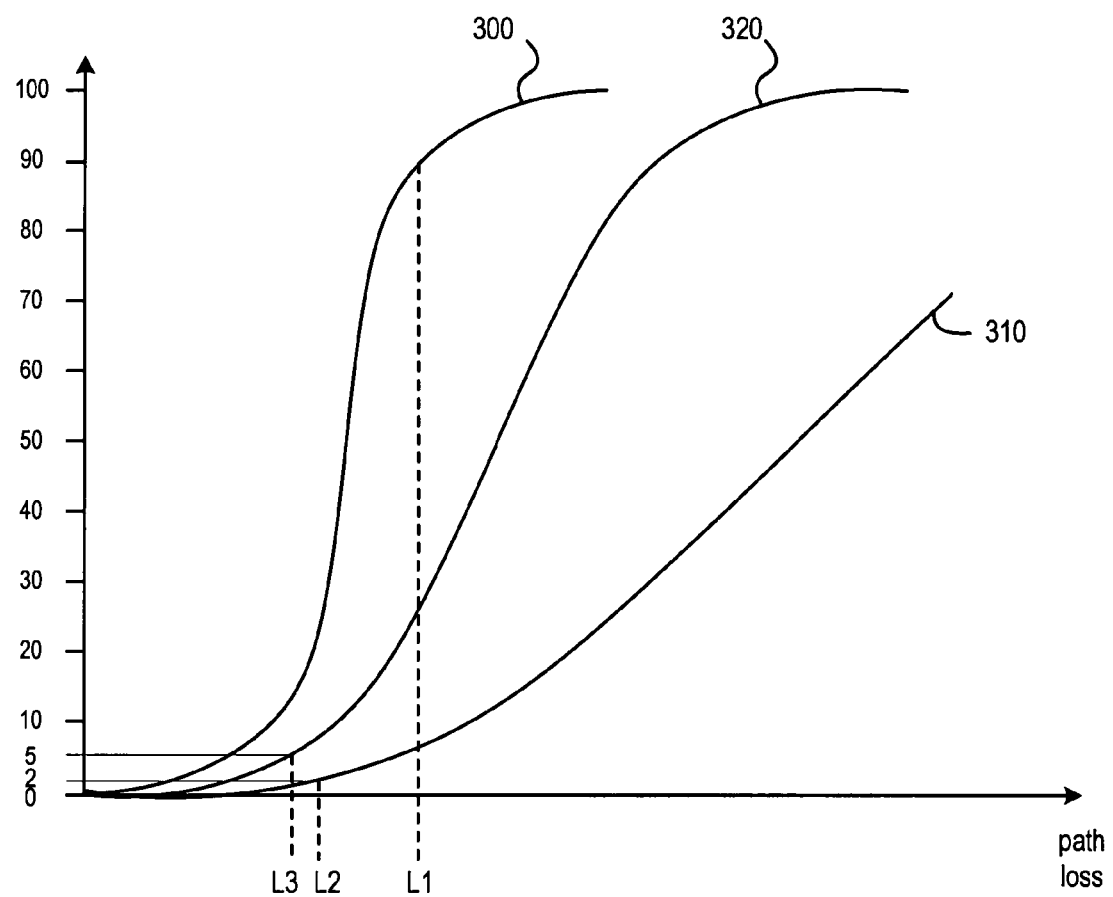
FIG. 3 illustrates typical results obtained performing the method illustrated in FIG. 2.

It can be assumed that the user will move around the premises 12, or at least the expected coverage area, and hence that this path loss will vary, depending on the position of the user at any time. In step 52, the femtocell access point 10 determines a statistical distribution of this first path loss. FIG. 3 illustrates a typical cumulative probability distribution, where the line 300 indicates the probability that any given femtocell user equipment at any given time will experience a path loss from the femtocell access point that is less than the indicated value.

In step 54, this cumulative probability distribution is used to determine the value L1 of the first path loss that is bettered by 90% of femtocell user equipments. The reason for this will be explained below.

It will be apparent that the value L1 of the first path loss could be chosen to be the value that is bettered by any desired proportion of femtocell user equipments, for example 80%, 90%, 95%, 98%, etc. In addition, while a method has been described in WO2008/093100, in which the statistical distribution of the path loss is determined, it would be possible instead simply to determine the value L1 as the path loss value that the desired proportion of measurements fall below.

Separately, by measuring the uplink noise rise at the femtocell access point 10 caused by the user equipment 22 connected to the macro layer base station 20 (referred to as a macro layer user equipment, MUE), it is possible (before the call is dropped or handed over) to estimate the macro layer user equipment transmit power and hence estimate in the femtocell access point 10 the path loss between the femtocell access point and the macro layer user equipment 22, without requiring any communications link between these two devices.

As is known, the femtocell access point 10 is able periodically to enter a listen mode, in which it is able to detect transmissions from macro layer neighbour cells. Specifically, in step 60, the femtocell access point 10 decodes information contained in the System Information Blocks (SIBs) transmitted by the surrounding macro layer base stations (MBSs), or nodeBs, and from this determines the scrambling codes and CPICH transmit power being used by the surrounding macro layer base stations.

In step 62, the femtocell access point 10 receives measurement reports from any femtocell user equipments that are in active mode. These femtocell user equipments report to the femtocell access point the detected CPICH RSCP levels of the transmissions from the surrounding macro layer nodeB neighbours. It will be noted that these reports can relate to neighbours that are operating on the same frequency as used by the femtocell access point 10 or on an alternative (typically adjacent frequency) carrier.

Hence, in step 64, the femtocell access point 10 can calculate the path loss distributions between the coverage area of the femtocell access point 10 and all macro layer nodeBs. FIG. 3 illustrates a typical cumulative probability distribution, where the line 310 indicates the probability that any given femtocell user equipment at any given time will experience a path loss from the macro layer base station that is less than the indicated value.

An assumption is now made that the femtocell user equipment 14 will for some part of its usage be positioned close to a window or an open door or the like of the premises 12. Based on this assumption, there is a high likelihood that, when the path loss between the macro layer base station and the femtocell user equipment is at its minimum value, this value will be similar to the average path loss at any given time between the macro layer base station 20 and a macro layer user equipment 22 that is nearby, either outdoors or in an adjacent premises. The assumption underlying this is that the path loss calculations are carried out on a logarithmic scale, and that both the femtocell user equipment and the macro layer user equipment are in the far field propagation area of the macro layer base station, where the variation is small across the relatively small coverage area of the femtocell access point. Hence, the average path loss between the macro layer base station 20 and a macro layer user equipment at any given time will be similar to the path loss between the macro layer base station and the femtocell user equipment is at its minimum value.

In step 66, therefore, the cumulative probability distribution is used to determine the value L2 of the path loss from the macro layer base station that only 2% of all samples gathered by femtocell user equipments fall below.

Using a path loss value that is smaller than the mean, as described here, tends to underestimate the transmit power of the macro layer user, and hence emphasizes the situation when a macro layer user equipment is collocated with the femtocell access point. However, it will be apparent that the value L2 of the first path loss could be chosen to be the value that is bettered by any desired proportion of femtocell user equipments, for example 1%, 2%, 3%, 5%, etc. In addition, while a method has been described in which the statistical distribution of the path loss is determined, it would be possible instead simply to determine the value L2 as the path loss value that the desired proportion of measurements fall below.

The value L2 is then used as an estimate of the average path loss experienced by a macro layer user equipment that is close to the femtocell access point 10, over the channel between the macro layer user equipment and its serving macro layer base station.

In step 68, this estimated path loss value L2 for the macro layer user is used, with knowledge of the typical noise floor of the nodeB 20, and assuming an adaptive multi-rate (AMR) compression scheme or other voice type with an assumed link performance value $E_b N_o$, to estimate the average transmit power of the macro layer user equipment as follows:

Average MUE Tx power=$L2$+nodeB noise floor−processing gain+$E_bN_o$

This estimation of the average transmit power of the macro layer user equipment will be acceptably accurate, as the macro layer user equipment will be in the far field of the macro layer base station, where the path loss variation will be small. Furthermore, it is expected that the macro layer user equipment will be connected to the nodeB to which there is the smallest path loss. Using the service link performance figure for voice is preferable because this is usually the most commonly used service. In addition, this will imply the lowest average macro layer user equipment Tx power, and hence the smallest path loss distribution to the femtocell access point. If anything, this could underestimate the path loss and hence over-emphasize the effect of the macro layer user equipment interference.

Once the average macro layer user equipment Tx power has been estimated, then it becomes possible to determine the distribution of path losses between the femtocell access point 10 and nearby macro layer user equipments, such as the UE 22. Specifically, a value can be obtained for the path loss between the femtocell access point 10 and the UE 22, based on this estimated average UE Tx power and measurements of the signal strength received at the femtocell access point.

Specifically, in step 70, the femtocell access point 10 detects signals transmitted by nearby macro layer user equipments. Specifically, the femtocell access point 10 can measure the RSSI of received uplink (UL) signals on the carrier that it is using, or it can measure the RSSI of signals on the adjacent or alternative carrier by periodically scanning that carrier. For example, the femtocell access point 10 typically scans to the adjacent carrier for about 10 msec in every minute, and captures a frame of UL data.

The assumption here is that any user equipments that are connected to the femtocell are power controlled through their inner/outer loop power control, and as such ride just above the uplink RSSI level detected at the femtocell access point, and hence that they add little to the detected RSSI level. However, action can be taken to subtract the effects of these femtocell user equipments if desired. Furthermore, it is only necessary to consider the macro layer user equipment that is closest to the femtocell access point, and whose signal is assumed to dominate the RSSI measured at the femtocell access point.

In step 72, the measured signals on the carrier frequency allocated to the femtocell access point 10 can be used to determine the RSSI distribution on that frequency, while the data obtained in multiple scans of the adjacent frequency can be used to determine the RSSI distribution on that frequency, by building up a histogram of the RSSI measurements.

As described earlier, multiple frequencies could be in operation on an operator's network. If the femtocell access point is causing interference on one of these carriers, macro layer user equipments may be forced to avoid that carrier. For example, as described above, a network operator may deploy two carrier frequencies as a camping carrier and a capacity carrier, with the capacity carrier being used by femtocell access points and also being used by macro layer base stations for an additional service such as HSDPA. Where the femtocell access point causes interference on the capacity carrier, this might mean that a user equipment would be forced to remain on the camping carrier, and would be unable to access the HSDPA service.

Using the determined RSSI distributions derived in step 72 and the estimated average macro layer user equipment Tx power determined in step 68, the femtocell access point is able in step 74 to derive estimates for the distribution of second path losses, i.e. of path losses between the femtocell access point 10 and the dominant, that is, the closest, macro layer user equipment such as the user equipment 22. Specifically, the femtocell access point is able to derive separate estimates in respect of the two carrier frequencies:

Second Path Loss distribution(carrier 1)=Average
    MUE Tx power−RSSI distribution     (carrier 1)

Second Path Loss distribution(carrier 2)=Average
    MUE Tx power−RSSI distribution     (carrier 2)

Thus, the femtocell access point is able to obtain separate estimates for the path losses between the femtocell access point 10 and the dominant macro layer user equipment, on the two carriers. Assuming that the dominant macro layer user equipment is transmitting on carrier 1, the femtocell access point 10 will measure higher RSSI levels on that frequency, and so it will derive a lower estimated value for the path loss on that frequency.

This provides useful results because of the way in which the estimates for these path losses can be used, as described in more detail below.

FIG. 3 illustrates a typical cumulative probability distribution, where the line 320 indicates the probability that any given macro layer user equipment at any given time will experience a path loss from the femtocell access point that is less than the indicated value. In particular, the value L3 is the value of the second path loss that only 5% of macro layer user equipments fall below. The use of this value will be described in more detail below.

According to one aspect of the invention, in step 90 of the process, certain interference events can be inferred from knowledge of the distribution of the first path losses between the femtocell access point 10 and its connected user equipments (and the resulting path loss value L1) on the one hand, and the distribution of the second path losses between the femtocell access point 10 and the macro layer connected user equipments (and the resulting path loss values L3 for carrier 1 and carrier 2) on the other hand.

For example, in a situation in which the camping carrier for the macro layer base station 20 is carrier 1 and the HSDPA capacity carrier is carrier 2, and the femtocell access point 10 is deployed on carrier 2, then an interference event can be detected as follows.

Specifically, a comparison can be made between the values L3 and L1 shown in FIG. 3. As described above, if the values L3 obtained for carrier 1 and carrier 2 are less than the value L1 (as is illustrated in FIG. 3), this means that at least a significant minority of macro layer user equipments are receiving signals from the femtocell access point 10 with lower path losses than a significant minority of femtocell user equipments. This suggests that the femtocell access point 10 might have been badly positioned in the premises 12, with the result that it needs to transmit its signals at such a high power (to ensure successful receipt by the connected femtocell UEs) that it causes interference to macro layer users.

Thus, in step 92, action is taken to remedy this situation. For example, the femtocell access point customer might be notified to relocate the femtocell access point device.

Until such time as the femtocell access point device is relocated by the user, it may independently take steps to reduce the risk of interference to macro layer users (albeit at the cost of reducing signal strength for its connected users), by reducing its maximum transmit power, or even switching off its transmitter.

Alternatively the second path loss distributions 320 for carrier 1 and carrier 2 could be used in combination with the first path loss distribution 300 in a soft biasing function (rather than a step function approach) that would trade the indoor coverage of the femtocell access point versus the interference caused to nearby macro layer users. More or less aggressive dynamic adjustments could be made dependant on whether there are any users camped on (or in active mode) on the femtocell access point and the relative difference between the path losses. In this case, again, the femtocell access point customer might also be notified that their coverage is being compromised, and that they have the option to relocate their femtocell access point device.

As a further alternative, in a situation in which the camping carrier for the macro layer base station 20 is carrier 1, and the femtocell access point 10 is deployed on carrier 2, then, if the median value of the second path loss for carrier 1 (i.e. the 50% point on the line 320 in FIG. 3) is less than the median value of the first path loss (i.e. the 50% point on the line 300), this implies that a number of macro layer users that are not registered with the femtocell access point are 'visiting' the premises 12. In this case, these users would be able to enjoy the full macro layer service offering if they were to register, and so a suitable notification can be sent to the femtocell access point customer, suggesting that the customer should register these macro layer users.

Further logical combinations of the calculated path losses between the femtocell access point and femtocell user equipments, and between the femtocell access point and macro layer user equipments collected for carrier 1 and carrier 2, can be used to make alternative decisions as to when an interference issue is likely to arise. In such cases, it is possible to guide the user to take remedial actions, or the femtocell access point can adjust its transmit power to minimize the interference effects to collocated macro layer users at the expense of the performance of femtocell users.

This information could also be combined with information derived from attempted (and failed) location area registrations by the unregistered macro layer users that would also occur when they are within the coverage area of the femtocell access point.

Through parameters provided in the ZoneGate Management System the operator could bias the behaviour of the algorithm to take aggressive steps to minimize the Macro Layer user impacts or less aggressive steps which will minimize the impact to the Femto Cell user. The bias value could also be calculated as a function of a Key Performance Indicator (KPI), in that the KPI could for example define the number of allowed macro layer dropped calls caused by local interference, or the size of the allowed dead zone around the femtocell access point.

Thus, there are provided a method for detecting conditions that may indicate an unacceptable level of interference for a non-attached macro layer user equipment, based on an estimated path loss between macro layer users and the femtocell access point.

The invention claimed is:

1. A method of operating a base station in a cellular network, the base station having a first coverage area, and being located in a second coverage area associated with a second base station, the method comprising:
   estimating a distribution of respective first path losses between the base station and points in the first coverage area;
   estimating in the base station a second path loss between said base station and a user equipment that is attached to the second base station by estimating a distribution of respective second path losses between said base station and one or more nearby user equipments that are attached to the second base station; and
   determining on the basis of said estimated first and second path losses whether the base station is causing interference with transmissions from the second base station by comparing a value of the first path loss corresponding to a first proportion of points in the first coverage area with a value of the second path loss corresponding to a second proportion of samples obtained from said nearby user equipments that are attached to the second base station.

2. A method as claimed in claim 1, further comprising, if it is determined that the base station is causing interference with transmissions from the second base station, sending a notification to a user of the base station.

3. A method as claimed in claim 1, further comprising, if it is determined that the base station is causing interference with transmissions from the second base station, reducing a transmit power of the base station.

4. A method as claimed in claim 1, further comprising, if it is determined that the base station is causing interference with transmissions from the second base station, ceasing transmissions from the base station.

5. A base station, for use in a cellular network, the base station having a first coverage area, and being located in a second coverage area associated with a second base station, and the base station being configured to:
   estimate a distribution of respective first path losses between the base station and points in the first coverage area;
   estimate a second path loss between the base station and a user equipment that is attached to the second base station by estimating a distribution of respective second path losses between the base station and one or more nearby user equipments that are attached to the second base station; and
   determine on the basis of said estimated first and second path losses whether the base station is causing interference with transmissions from the second base station by comparing a value of the first path loss corresponding to a first proportion of points in the first coverage area with a value of the second path loss corresponding to a second proportion of samples obtained from said nearby user equipments that are attached to the second base station.

6. A base station as claimed in claim 5, wherein the base station is further configured such that if it is determined that the base station is causing interference with transmissions from the second base station, the base station sends a notification to a user of the base station.

7. A base station as claimed in claim 5, wherein the base station is further configured such that if it is determined that the base station is causing interference with transmissions from the second base station, the base station reduces a transmit power of the base station.

8. A base station as claimed in claim 5, wherein the base station is further configured such that if it is determined that the base station is causing interference with transmissions from the second base station, the base station ceases transmissions.

9. A method of operating a base station in a cellular network, the base station having a first coverage area, and being located in a second coverage area associated with a second base station, the method comprising:
   estimating a distribution of respective first path losses between the base station and points in the first coverage area;

estimating in the base station a second path loss between said base station and a user equipment that is attached to the second base station by:
  estimating the average transmit power of the user equipment that is attached to the second base station by estimating a third path loss between the user equipment that is attached to the second base station and said second base station, wherein the step of estimating the third path loss comprises:
    estimating a distribution of respective fourth path losses between the second base station and points in the first coverage area; and
    estimating the third path loss as equal to a determined value of the fourth path loss, wherein the determined value of the fourth path loss is exceeded by the fourth path loss that applies for a specified percentage of said points in the first coverage area;
  detecting in the base station signals transmitted by the user equipment that is attached to the second base station; and
  estimating the second path loss from a difference between the estimated average transmit power and the power of the detected signals transmitted by the user equipment that is attached to the second base station; and
determining on the basis of said estimated first and second path losses whether the base station is causing interference with transmissions from the second base station.

10. A method as claimed in claim 9, wherein the specified percentage is at least 95%.

11. A method as claimed in claim 9, further comprising, if it is determined that the base station is causing interference with transmissions from the second base station, sending a notification to a user of the base station.

12. A method as claimed in claim 9, further comprising, if it is determined that the base station is causing interference with transmissions from the second base station, reducing a transmit power of the base station.

13. A method as claimed in claim 9, further comprising, if it is determined that the base station is causing interference with transmissions from the second base station, ceasing transmissions from the base station.

14. A base station, for use in a cellular network, the base station having a first coverage area, and being located in a second coverage area associated with a second base station, and the base station being configured to:
  estimate a distribution of respective first path losses between the base station and points in the first coverage area;
  estimate a second path loss between the base station and a user equipment that is attached to the second base station by:
    estimating the average transmit power of the user equipment that is attached to the second base station by estimating a third path loss between the user equipment that is attached to the second base station and said second base station by:
      estimating a distribution of respective fourth path losses between the second base station and points in the first coverage area; and
      estimating the third path loss as equal to a determined value of the fourth path loss, wherein the determined value of the fourth path loss is exceeded by the fourth path loss that applies for a specified percentage of said points in the first coverage area;
    detecting in the base station signals transmitted by the user equipment that is attached to the second base station; and
    estimating the second path loss from a difference between the estimated average transmit power and the power of the detected signals transmitted by the user equipment that is attached to the second base station; and
  determine on the basis of said estimated first and second path losses whether the base station is causing interference with transmissions from the second base station.

15. A base station as claimed in claim 14, wherein the specified percentage is at least 95%.

16. A base station as claimed in claim 14, wherein the base station is further configured such that if it is determined that the base station is causing interference with transmissions from the second base station, the base station sends a notification to a user of the base station.

17. A base station as claimed in claim 14, wherein the base station is further configured such that if it is determined that the base station is causing interference with transmissions from the second base station, the base station reduces a transmit power of the base station.

18. A base station as claimed in claim 14, wherein the base station is further configured such that if it is determined that the base station is causing interference with transmissions from the second base station, the base station ceases transmissions.

* * * * *